US008869142B2

(12) United States Patent
Gouge et al.

(10) Patent No.: US 8,869,142 B2
(45) Date of Patent: Oct. 21, 2014

(54) SECURE CONTENT PUBLISHING AND DISTRIBUTION

(75) Inventors: Christopher S. Gouge, Redmond, WA (US); Craig C. Marl, Seattle, WA (US); David C. Hennessey, Duvall, WA (US); David E. Kays, Bellevue, WA (US); Edward F. Reus, Woodinville, WA (US); Krishnan Rangarajan, Bellevue, WA (US); Marc Shepard, Bellevue, WA (US); Mazhar N. Mohammed, Sammamish, WA (US); Steve P. Shih, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1754 days.

(21) Appl. No.: 11/341,741

(22) Filed: Jan. 27, 2006

(65) Prior Publication Data
US 2007/0234343 A1 Oct. 4, 2007

(51) Int. Cl.
G06F 9/44 (2006.01)
G06F 9/445 (2006.01)
H04L 29/06 (2006.01)
G06F 21/51 (2013.01)
H04L 29/08 (2006.01)

(52) U.S. Cl.
CPC .............. *H04L 63/123* (2013.01); *G06F 21/51* (2013.01); *H04L 67/34* (2013.01)
USPC ........... 717/177; 717/169; 717/171; 717/175; 726/4; 726/6

(58) Field of Classification Search
None
See application file for complete search history.

(56) References Cited

U.S. PATENT DOCUMENTS

| 5,005,122 | A  | * | 4/1991  | Griffin et al. ............... 709/203 |
| 5,586,310 | A  | * | 12/1996 | Sharman .......................... 1/1 |
| 5,894,516 | A  |   | 4/1999  | Brandenburg |
| 5,999,740 | A  |   | 12/1999 | Rowley |
| 6,205,480 | B1 | * | 3/2001  | Broadhurst et al. .......... 709/225 |
| 6,237,020 | B1 |   | 5/2001  | Leymann et al. |
| 6,286,041 | B1 |   | 9/2001  | Collins, III et al. |
| 6,308,326 | B1 | * | 10/2001 | Murphy et al. ............... 717/174 |
| 6,665,867 | B1 |   | 12/2003 | Ims et al. |
| 6,675,382 | B1 | * | 1/2004  | Foster ........................... 717/177 |
| 6,725,453 | B1 |   | 4/2004  | Lucas et al. |
| 6,859,699 | B2 | * | 2/2005  | Carroll et al. .................. 701/33 |

(Continued)

OTHER PUBLICATIONS

Dautermann Michael, "A Technique for Improving Mirror Performance: The servers Directs the Customer", 2002, Wayne State University, p. 2-15.*

(Continued)

*Primary Examiner* — Lewis A Bullock, Jr.
*Assistant Examiner* — Mark Gooray
(74) *Attorney, Agent, or Firm* — Kate Drakos; David Andrews; Micky Minhas

(57) ABSTRACT

Sending installation information. A method may be performed, for example, in a network computing environment including one or more servers connected to one or more clients. The method includes signing a package including installation information. A hash of the package is created. A metadata data set is created. The metadata data set includes a description of the package, an identification for the package, applicability rules describing intended recipients of the installation information, the hash of the package, and installation instructions for the package. The metadata data set is sent to a target group of systems in the network computing environment.

19 Claims, 3 Drawing Sheets

(56) References Cited

U.S. PATENT DOCUMENTS

| | | | |
|---|---|---|---|
| 6,912,711 | B1 | 6/2005 | Curtis et al. |
| 6,954,930 | B2 | 10/2005 | Drake et al. |
| 7,165,250 | B2* | 1/2007 | Lyons ............................ 717/177 |
| 2002/0129356 | A1 | 9/2002 | Hellerstein et al. |
| 2003/0037328 | A1* | 2/2003 | Cicciarelli et al. ............ 717/178 |
| 2004/0123286 | A1 | 6/2004 | Kang et al. |
| 2004/0139430 | A1 | 7/2004 | Eatough et al. |
| 2004/0181687 | A1* | 9/2004 | Nachenberg et al. ......... 713/201 |
| 2004/0181790 | A1 | 9/2004 | Herrick |
| 2005/0132356 | A1* | 6/2005 | Cross et al. .................... 717/174 |
| 2007/0169114 | A1* | 7/2007 | Olsen et al. .................... 717/174 |
| 2007/0214453 | A1* | 9/2007 | Dive-Reclus ................. 717/175 |

OTHER PUBLICATIONS

PCDUO Enterprise Managing the Networked Enterprise "Software Distribution" PC-DUO Enterprise Sofware Distribution enables users to remotely install applications and updates within minutes, eliminating the need to visit individual PCs Vector Networks Inc., pp. 1-2 http://www.vector-networks.com/enterprise/datasheets/software_distribution.pdf.

LookSmart "PictureTaker supports Windows Me—LANovation has announced version 3.1 of its PictureTaker software deployment tools—Brief Article—Product Announcement", pp. 1 Copyright 2000 Plesman Publications Copyright 2001 Gale Group http://findarticles.com/p/articles/mi_m3563/is_25_16/ai_68743882/print.

Novell Documentation: ZENworks 7—Upgrade Using a Server Software Package "Upgrade Using a Server Software Package", pp. 1-10 http://www.novell.com/documentation/zenworks7/index.html?page=/documentation/zenworks7/sm7install/data/bpejma0.html.

Kartik Kanakasabesan, IBM DeveloperWorks "Using Tivoli software distribution with Rational ClearCase UCM". pp. 1-12 http://www-128.ibm.com/developerworks/rational/library/5447.html.

* cited by examiner

SECURE CONTENT PUBLISHING AND DISTRIBUTION

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Organizations often have a number of computers for use by employees or members of the organization. Due to various licensing requirements, organizations often have need to maintain an inventory of software installed on computer systems throughout the organization. Additionally, there is often a need to deploy software to multiple computer system in an organization. Such software may include new applications for use by members of the organization, software updates to existing applications, and the like.

The task of installing software at computer systems within an organization is often delegated to a centralized department of the organization such as the IT department. There may be a need or desire to install software fairly quickly. For example, security updates should be installed quickly to prevent software flaws from being exploited by malicious individuals desiring to disrupt computing operations or to steal data. If an individual or group of individuals is tasked with visiting each machine in an organization, the labor costs and time costs may be unfavorable. As such, various solutions have been implemented that allow for software to be centrally distributed on a network. This allows for multiple deployments to occur simultaneously. Additionally, the deployments can be automated so as to minimize labor costs.

One challenge with the presently implemented central deployment systems relates to security, or more accurately, the lack thereof. Central deployment systems have often not been as concerned with security of the central deployment system. Traditionally, organization networks have been sufficiently isolated so as to avoid external attacks. However, with the interconnection of internal networks with external networks, such as the Internet, potential for malicious intrusion has increased.

Central deployment system can also be used by malicious individuals to deploy harmful software such as viruses, spyware, and the like.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of sending installation information. The method may be performed, for example, in a network computing environment including one or more servers connected to one or more clients. The method includes signing a package including installation information. A hash of the package is created. A metadata data set is created. The metadata data set includes a description of the package, an identification for the package, applicability rules describing intended recipients of the installation information, the hash of the package, and installation instructions for the package. The metadata data set is sent to a target group of systems in the network computing environment.

Another embodiment described herein includes a method of performing installation tasks. The method may be performed, for example, in a network computing environment including one or more servers connected to one or more clients. The method includes receiving metadata as part of a targeted distribution. The metadata includes a description of a package, an update id for the package, applicability rules describing intended recipients of the package, a hash of the package, and installation instructions for the package. The applicability of the package is determined from the metadata. if the package is applicable the package is downloaded. A hash of the package is calculated. The calculated hash of the package is verified against the hash of the package in the metadata. A signature of the package verified. If the hash and the signature are valid installation tasks are performed by selecting an appropriate installer based on the instruction in the metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
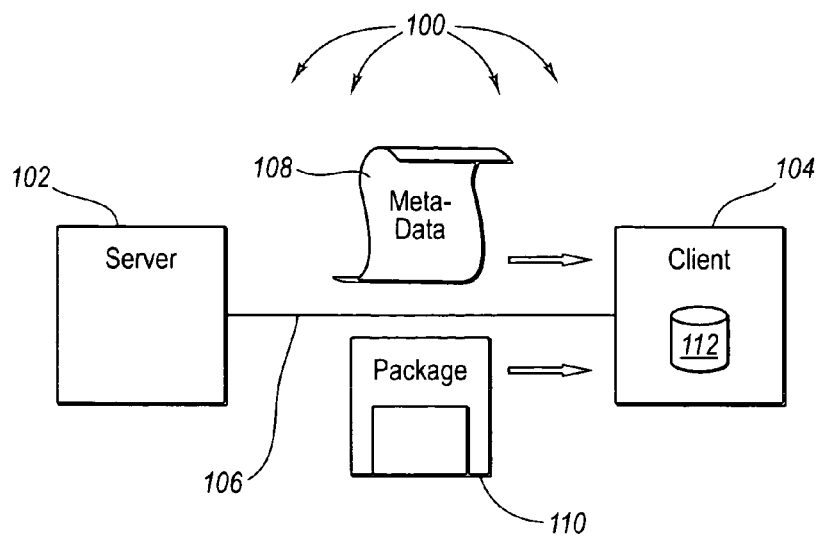
FIG. 1 illustrates a server/client connection where update information can be exchanged.

Embodiments herein may comprise a special purpose or general-purpose computer including various computer hardware, as discussed in greater detail below.

In one exemplary embodiment, software installation processes, including software un-installation, is facilitated in a centralized fashion by a software distribution server providing metadata and package installation files to a client system.

The package installation files, may in one embodiment include one or more cabinet files. Notably, as used herein, a client may perform as a server machine. For example, the systems described herein include embodiments where software is distributed to a server class machine from a software distribution server. In this scenario, the server class machine is a client to the software distribution server.

A software distribution server, in one example, provides metadata to a client. The metadata may include, among other things, a description of software to be installed, an ID number, including a package serial number and a metadata revision number, applicability rules defining appropriate conditions for installation activities to be performed at a system, a reference to the software that is described in the installation instructions for installing the software, and a classification of the software, such as a classification as an application or a security or critical update.

The metadata further may include a hash of a signed package containing the software described by the metadata. The hash may be used subsequently to determine that software has not been corrupted or maliciously altered.

At the client system, the client system examines the metadata to determine if the software to be installed is applicable to the particular client. For example, the metadata may include applicability rules specifying that the software may be applicable to computers running certain operating system including service pack levels of the operating system, running certain software, having certain hardware, running a particular CPU architecture, have not previously installed the software, etc. If the client system determines from the metadata that software is appropriate for the client system, then the client system sends a request to the software distribution server to obtain the software. The software distribution server then sends the package to the client system.

At the client system, the client system performs a hash calculation on the received package. This calculated hash can then be compared to a hash included in the metadata to ensure that the package has not been corrupted or maliciously altered. As described previously, the package is signed at the software distribution server. The client system may also validate this signature to ensure the validity of the package. If the package passes these validation steps, the client system can follow installation instructions included in the metadata to install the software included in the package. For example, the installation instructions may specify a particular command line instruction and/or installation tool to install the software included in the package.

Referring now to FIG. 1, one specific example is shown with reference to a network topology 100. In the topology 100, a server 102 is coupled to a client 104 through a connection 106. The connection 106 may be for example a suitable network connection or other appropriate connection. Some embodiments contemplate that the connection 106 may be a SSL connection or other secure connection thus further enhancing the security of the file transfer and installation processes.

In one embodiment, the server 102 stores metadata 108 and a package 110. The package 110 may include a software application or installer for installation on machines in the topology 100. For example, the package 110 may include executable installation files for installing applications, installing updates, running scripts, uninstalling applications, and the like. In one embodiment, the package 110 may be embodied as one or more cabinet files. The cabinet files may be compresses to reduce storage size and network traffic. Embodiments may further include combinations of software being included in the package 110. For example, a package 110 may include both an application and any appropriate patches for the application in a single package. Notably, a software package may include more than one cabinet file. Thus, while the examples herein refer to a single cabinet file it should be noted that embodiments may also be implemented where a number of cabinet files are used. This may be useful for example when a large package is being deployed. The package can be split into a number of smaller cabinet files.

The metadata 108 includes information about the package 110. For example, the metadata 108 may include a description of software to be installed, an ID number, including a package serial number and a metadata revision number, applicability rules, a reference to the software that is described, installation instructions for installing the software, and a classification of the software, such as a classification as an application or a security or critical update.

As mentioned, the metadata 108 includes applicability rules. The applicability rules may define systems for which the software installation processes are appropriate. For example, the software installation processes may be an update to an existing software application. As such, the applicability rules may specify that a software application, including a particular revision or version, already be installed on a client system. Other applicability rules may specify certain hardware requirements, appropriate operating systems requirements, or other software requirements applicable to the software installation processes. Still other rules may specify that the software installation processes is only applicable to clients that have not previously performed the software installation process specified in the metadata 108.

The metadata 108 may further include a hash of the package 110 after the package 110 has been signed. In one embodiment, creation of the hash file and signing of the package 110 may occur at the server 102. Other embodiments contemplate that the metadata 108 and package 110 are received from another software distribution server such as a centralized software distribution server.

In one embodiment where the package 110 is signed at the server 102 and the hash is created at the server 102, the signing process may be performed by creating a unique self signed certificate installed on the server 102. The certificate may be for example a code signing certificate which includes the associated private key. In one embodiment, when the certificate is a self-signed certificate, it should include at least a 1024 bit key. The server 102 then publishes a public key through an alternate communication channel to the client 104. In the example shown, the server 102 that signs the certificate, and thus the package 110, is the root of the trust chain for the certificate. At the client 104 side, software published from and signed by the server 102 is trusted. In one embodiment, a new policy setting can be set at the client 104 which indicates that the client 104 should trust content signed by the root of the trust chain, i.e. the server 102.

Other embodiments contemplate that the package 110 may be signed by having installed a certificate from a third party certificate provider such as Verisign at the server 102. In addition, one embodiment may include receiving a code signing certificate from other sources, such as for example an internal corporation certificate authority.

The metadata can be subject to various security protections as well to prevent malicious tampering. For example, the metadata may be sent using a secure authenticated protocol. One exemplary protocol that may be used is SSL. Additionally, the metadata may be signed. As such clients and/or downstream servers can validate that the metadata has not been tampered with.

At the client 104, the client 104 first determines that it is part of a target group for which the software installation processes is intended. This may be done by the client invoking a webmethod or other query to the server 102 to determine if the client 104 is part of a target group. If the client 104 determines that it part of the target group for the software installation processes, then the client 104 consults the applicability rules included in the metadata 108 to determine the appropriateness of performing the software installation processes. As described above, the applicability rules may include factors with considerations such as installed software and/or hardware, operating systems and the like. If the performing the software installation processes is appropriate, the client requests the package 110. The client 104 can then validate the package 110 to ensure that the package 110 has not been corrupted or altered.

The client 104 can validate that the package 110 is the correct file by verifying the signature of the package 110. In addition, the client 104 can verify that the package 110 has not been corrupted or altered by performing various hash functions. For example, the client 104 can calculate the hash of the package 110. Notably, calculating the hash may include calculating a number of hashes. For example, when the package includes a number of cabinet files, a hash may be calculated for each cabinet file. The calculated hash is then compared with a hash value in the metadata 108 which was calculated previously and included in the metadata. Such a comparison can be used to determine that the package 110 has not been corrupted or altered.

If the package 110 passes the validation processes, i.e. validation of the signature and validation of the hash, then the package 110 can be extracted and the software installation processes performed at the client 104. In one embodiment, the metadata 108 includes installation instructions that indicate how the software installation processes from the package 110 should be performed. For example, the installation instructions may specify a particular installer, such as installers using MSI for Microsoft Windows installer and MSP for Microsoft Windows patch content types, script, and/or a particular command line instruction. Notably, as described above, cabinet installation may include applications for un-installation of software as well as installation of software. In another alternative embodiment, the package 110 may include functionality for removing an application and installing a new version of the application or reinstalling the application. This particular embodiment may be especially useful when there is a desire to reinstall an application.

Several alternative embodiments may be implemented to facilitate how application software is handled. For example, one embodiment may include a uniform naming convention (UNC) path providing access to an installation file. Other distribution paths may also be referenced such as peer-to-peer channels, broadcasts, and the like. Alternatively, the package 110 may include a compressed software installation file that may be retained indefinitely at the client 104 and that may be used for repairs and reinstallations. In yet another alternative embodiment, the package 110 may include a compressed software installation file that may be later discarded during a cleanup process after software installation processes have been performed at the client 104.

As alluded to above, some software packages may support self-repair. In one embodiment, to facilitate this functionality, a client 104 is provided direct access to the original installation files. On the server 102 that the content was originally published on, an applications directory may be created and the installation files copied to it. This directory can then made accessible to clients of the server 104. In one embodiment, the directory is made accessible in read-only mode. This access to the original files may be made available to clients not directly connected to the publishing server, but rather connected to a down-stream-server without the client having network access to the original publishing server. To facilitate support for repair in a server hierarchy, when the down stream servers receive the content as the package 110 distributed throughout the server hierarchy they may unpack content in a cabinet file included in the package 110 into a well-known applications directory that mirrors the one on the publishing server and that is reachable by the client systems they manage.

The client 104 further includes a database 112 that can be updated to track installation activities. For example, if installation is successful, an indication can be made in the database 112. The database 112 is able to be queried by other systems such as the server 102 or other systems used for tracking software installation processes. In one embodiment, an indication in the database 112 indicating that a software installation processes have been successfully installed can be used to prevent subsequent installations of the same software installation processes again on the same system. Additionally, inventory systems can query the database 112 for creating inventory information regarding what applications are installed within an organization and/or on a particular system. The database 112 may further include an indication that software installation processes were unsuccessful. This can be used in various troubleshooting operations.

Returning once again to the discussion of activities performed at the server 102 various activities will now be described useful for creating appropriate packages 110 and metadata files 108. The server 102 may receive various applications for installation on clients 104 in the topology 100. In particular, it should be noted that authoring and publishing of content can be separated into two separate roles. These roles can be additionally separate from the deployment role. As such the author of content may be separate from the publisher of content who can additionally be separate from the administrator that finally deploys content to client systems. In one embodiment, an administrator at the server 102 may use an application publishing user interface to facilitate creation of the metadata 108 and the package 110. Using the user interface, the administrator can specify the application to be installed as well as the metadata 108 described above including items such as title of the application, the description of the application, installation instructions, un-installation instructions, identification numbers, and the like. It should be noted at this point that various portions of the metadata 108 may be either entered by the administrator using the user interface or may be default information obtained from an installer program. The metadata 108 may further include a UNC path where the package 110 can be obtained. In one embodiment, the user interface may further include functionality for allowing an administrator to revise the metadata 108.

Referring once again to the package 110, a deployment package including one or more cabinet files may be embodied as a delta package. A delta package may include information that has changed or is new information since the publishing of a related package at an earlier time. For example a package deploying a weekly update to an address book may be deployed. In one embodiment, a delta package may be deployed which includes installation tools to add new entries and to remove any appropriate entries. In one embodiment, two packages may be deployed. The first, a delta package, may be targeted to systems that have previously received update packages. The second, a full package, may be directed at new systems. As such, it is likely that the delta package would be more widely distributed over time such that network bandwidth and other resources could be conserved by only deploying new or changed data.

In the scenario described above related to the delta package, both the first and second packages described could be signed to protect against tampering. In one embodiment a hash that may be applied to the delta package may be a hash for a final package including a collection of information including the data updated by the delta packages. In this way, any failure in the reconstruction process would allow a system to detect the failure and to retrieve the second full package. Notably, if a delta package were to affect multiple files at a system, multiple hash values may be included in the metadata 108.

FIG. 1 illustrates the direct one to one relationship of a server 102 to an individual client 104. However, it should be appreciated that servers can provide software to a larger number of clients. In particular, various embodiments contemplated herein allow for server computers to target subsets of computers within an organization.

Figure 2:
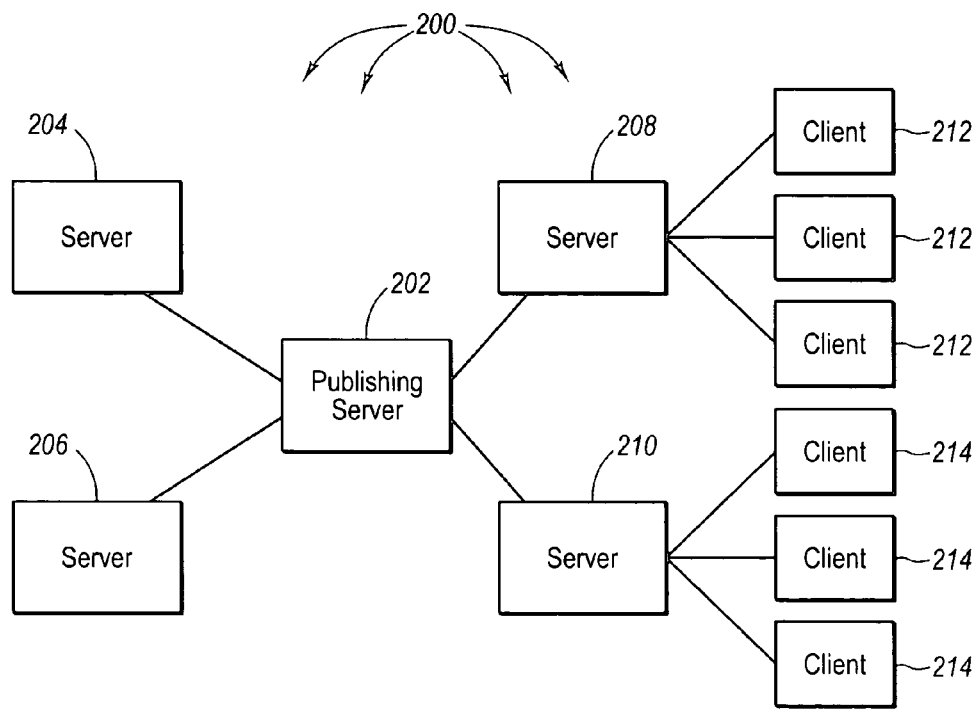
FIG. 2 illustrates an extended network of servers and clients.

Referring now to FIG. 2, a topology 200 is shown, illustrating a high level overview of interconnections that may exist within an organization's networking environment. The topology 200 illustrated in FIG. 2 includes a publishing server 202 connected to a number of other servers 204, 206, 208, 210. FIG. 2 further illustrates clients 212, 214 connected to the servers 208 and 210 respectively. Notably, while the example here illustrates a single hierarchy, other embodiment may include deeper hierarchies.

The topology 200 illustrated in FIG. 2 may be representative of an organizations network, such as a corporate WAN or LAN environment, such as for example an enterprise network. Software installation processes can be targeted to a specific target group.

Some embodiments allow for target groups to be specified for software distribution. For example, an administrator at the publishing server 202 may specify that a particular software title or update is to be distributed to a target group identified as database servers. The database servers target group may include for example the servers 204 and 206. The servers 204, 206, 208, and 210 may include functionality for communicating with the publishing server 202 to determine if there are installation activities to be performed at the servers 204, 206, 208, and 210. As such, the servers 204 and 206 can determine that they are the target of installation activities as a result of their being included in the database servers target group. Thus the servers 204 and 206 can download metadata, such as the metadata 108 illustrated in FIG. 1. The servers 204 and 206 can then determine if they meet other requirements specified in the metadata such as appropriate CPU architecture, operating system and service pack, hardware, software, etc. If the servers 204 and 206 determine that they appropriately meet conditions for installation activities, then the servers 204 in 206 can download a package which may include for example an application to be installed at the servers 204 in 206. As such, the installation activities may be performed at the servers 204 in 206.

Notably, installation activities can be specified for a number of different particular target groups. In addition, individual systems may belong to more than one target group. In one particular embodiment, a single system may belong to different branches of a hierarchical organization of target groups. To facilitate a system belonging to multiple target groups, conflict rules may be implemented. The conflict rules may be useful as conflicting installation activities may be rolled out to different target groups to which a single system belongs. For example, an installation activity that specifies that a particular application is to be installed to all test computers may conflict with an installation activity that specifies that the same application is to be uninstalled from all servers. A system may belong to both the test target group and the server target group. To resolve these conflicting roll-outs, conflict resolution rules may be implemented. For example, rules may specify weighting depending on a position in a hierarchy. Other rules may specify a preference for certain activities. For example, installations may be preferred over un-installations. Rules may specify a preference for newer installation activities. Other rules may also be implemented.

In one embodiment, packages and metadata such as the package 110 and metadata 108 illustrated in FIG. 1 can be distributed to other servers such as servers 208 and 210 from the publishing server 202. The other servers 208 and 210 can then perform publishing server functionality for clients 212 and 214 connected to the servers 208 and 210. For example, the clients 212 and 214 may be included in a target group for which installation activities are specified. Once the clients 212 and 214 have determined that installation activities are to be performed, the clients 212 and 214 can connect to the servers 208 and 210 respectively to download the metadata. After the clients 212 and 214 have examined the metadata, the clients 212 and 214 can determine whether or not the installation activities are appropriate for the clients 212 and 214. If the installation activities are appropriate, the clients 212 and 214 can download a package to perform the appropriate installation activities. Understandably, validation, as described previously may be performed. In one embodiment, the publishing server 202 may be the root of a trust chain for certificates for packages received at the clients 212 and 214.

Additionally, downstream servers that receive packets as for distribution may validate the signature and hash of the package before making the package available to clients of the downstream servers.

Note that not all of the servers in the server hierarchy need to be treated equally. Servers can be separated into downstream servers. Portions of the content could be directed to all servers and some could be designated to only some servers. For example, assume that there is a desire to support an internal software deployment directed only to a regional office without access available to the rest of an organization. In the publishing server 202 a downstream servers test target group could be created and a package with the internal software deployment directed to that group. In the server configuration of the regional office server, e.g. 208, a program key may be specified. Then when the regional office server 208 contacts the publishing server 202, the regional office server 208 uses the program key to assert that the regional office server 208 desires the additional content. Other servers, e.g. 204, 206 and 210 in the hierarchy do not see the particular internal software deployment because they are not associated with the downstream servers test target group.

From a protocol point of view, the regional office server 208 may present the program key to the publishing server 202 during an authentication portion of a server-server protocol. The publishing server 202 could then, in one embodiment, verify that that particular regional office server 208 has the right to package for the internal software deployment associated to that program key. An encrypted cookie if that is then passed back to the regional office server 208, and passed up for each call that the regional office server 208 uses to replicate metadata and content, enables access to the associated content that was deployed to the downstream servers test target group.

Figure 3:
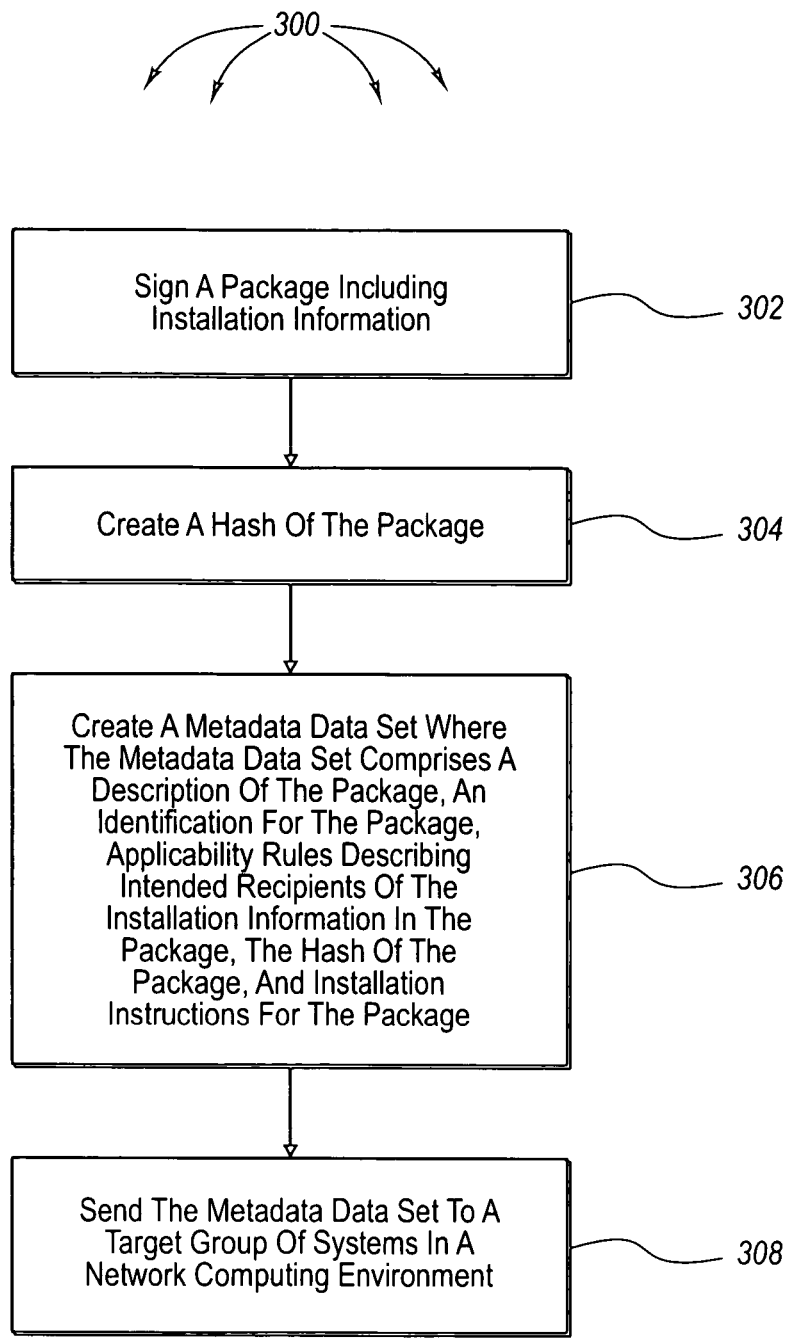
FIG. 3 illustrates a method of sending installation information.

Referring now to FIG. 3, a method 300 of sending update information is illustrated. The method may be practiced for example, in a network computing environment including one or more servers connected to one or more clients. The method includes signing a package including installation information (act 302). Signing a package may include signing using a self-signed certificate. For example, a server may sign the package where the server itself is the root of a trust chain. The self-signed certificate may be for example a code signing certificate which includes the associated private key. In one embodiment, when the certificate is a self-signed certificate, it should include at least a 1024 bit key. Signing a package may include signing using a third party installed certificate. For example, the package may be signed using a certificate from a third-party certificate authority such as Verisign. In addition, one embodiment may include receiving a code signing certificate from other sources, such as for example and internal corporation certificate authority.

The installation information may include various different items. For example, the installation information may include applications for installation at a target. The installation information may include updates, such as application, driver, operating system and the like updates. The application information may further include information or files used for uninstalling software.

Referring once again to FIG. 3, the method 300 further includes creating a hash of the package (act 304). As described previously, a server may create a hash of a package by performing various hash calculations. The calculated hash may be used later by a client to ensure that the package has not been altered or corrupted.

FIG. 3 further illustrates that the method 300 includes creating a metadata data set (act 306) The metadata data set includes a description of the package, an identification for the package, applicability rules describing intended recipients of the installation information, the hash of the package, and installation instructions for the package.

The method 300 also includes sending the metadata data set to a target group of systems in the network computing environment (act 308). As described previously, sending the metadata data set to a target group of systems in the network computing environment may include sending over a secure channel. For example, the metadata may be sent over an SSL channel to further ensure the security of the metadata.

The method 300 may further include other various acts. For example, the method 300 may be performed such that the metadata data set further includes an indication that the package is one of an application or update. For example, the metadata data set may include information specifying that a full application is being deployed. Alternatively, the metadata data set may include an indication that only an update to a previously existing application, operating system, driver, etc is being deployed.

The metadata data set may further include a priority indication for the package. For example, the metadata may specify that the package includes at least one of a security update and/or a critical update. When the metadata data set includes an indication that an update is being deployed, additional information may be useful to identify the update as a critical update, a security update, a general update, or an optional update. A client can then determine the applicability and/or priority of the update. For example, a client may apply higher priority installation activities before lower priority installation activities. For example, a security update would likely be given priority over an update to data in a database.

The method 300 may further include receiving a request from a system from among the target group of systems for the package and sending the package. For example, as illustrated in FIG. 1, a client 104 may determine that the installation information applies to the client 104. As such, the client 104 may request the package specified in the metadata data set. This request may be received by the server 102 and the server 102 may transmit the package to the client 104.

The method 300 may further include performing an antivirus scan of one or more application files included in the package. In one embodiment, the antivirus scan may be performed prior to the applications being compressed into a cabinet file. Centralized installation servers are useful for deploying applications, and as such they can be useful to malicious individuals for deploying viruses. As such, it may be useful to perform an antivirus scan of applications included in packages such that the files are not used to distribute harmful viruses.

The metadata data set may further include expiration information for the installation information. For example, it may be desirable to specify a finite amount of time in which installation activities should take place. As such, an expiration time may be specified in the metadata data set.

The metadata data set may further include information specifying an installer. As discussed previously, several installers may be specified in the metadata data set. For example, in one embodiment the installer specified is a command line installer. In this particular embodiment, the metadata data set may include the command line command for installing an application or update at a target system. As described previously, the metadata data set may alternatively specify that the installer is an installer for MSI type content, MSP type content or the like.

Sending the metadata data set to a target group of systems in the network computing environment (308) may include publishing at a root server and passing down the metadata to other servers in a hierarchy for distribution to one or more systems in the target group. For example, as illustrated in FIG. 2, the publishing server 202 may act as a root server which passes metadata down to the other servers 208 and 210.

Figure 4:
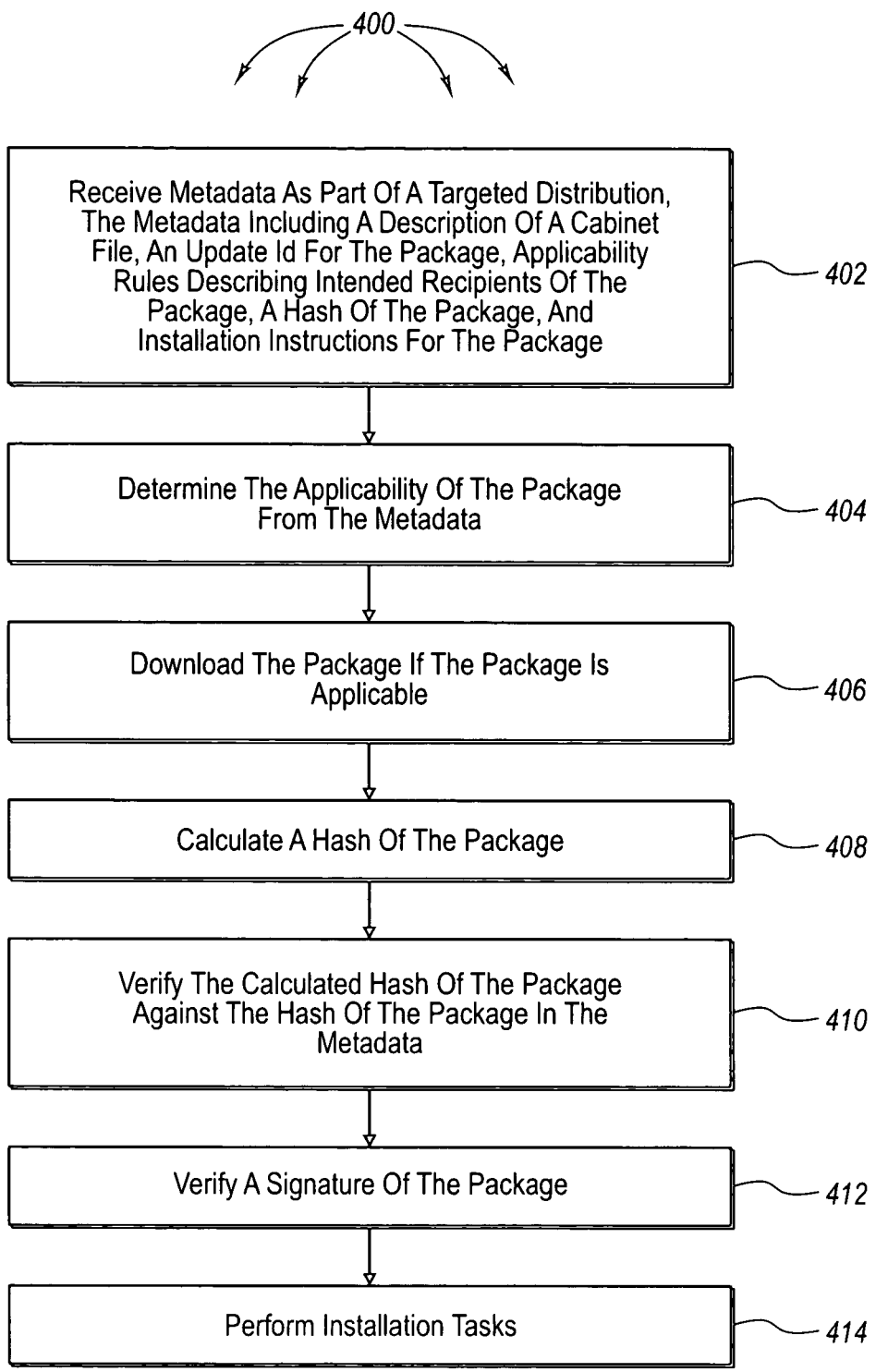
FIG. 4 illustrates a method of receiving installation information.

Referring now to FIG. 4 a method 400 of performing installation tasks is illustrated. The method 400 may be practiced for example in a network computing environment including one or more servers connected to one or more clients. The method includes receiving metadata as part of a targeted distribution (act 402). The metadata includes a description of a package, an update id for the package, applicability rules describing intended recipients of the package, a hash of the package, and installation instructions for the package.

The method 400 further includes determining the applicability of the package from the metadata (act 404). for example, and referring again to FIG. 1, A client 104 may examine meta data 108 to determine the applicability of a package 110. Ability may be based on, for example, having certain hardware or software installed at the client 104 were various other factors.

Referring once again to FIG. 4, if the package is applicable the method 400 further includes downloading the package (act 406). As illustrated in FIG. 1, The client 104 may download the package 110 from the server 102.

Referring once again to FIG. 4, the method 400 further includes calculating a hash of the package (act 408). Also illustrated in FIG. 4, the method 400 includes verifying the calculated hash of the package against the hash of the package in the metadata (act 410). This allows the client 114 verified that the package 110 has not been maliciously altered or corrupted.

To additionally verify the integrity of the package 110, the method 400 further includes verifying a signature of the package (act 412). Verifying the signature may include accepting a certificate with a sever from which the package was downloaded as the root of the trust chain for the certificate. Alternatively, a third party certificate issuer, such as Verisign, may be a root of the trust chain for the certificate. If the hash and the signature are valid the method 400 includes performing installation tasks (act 414). For example, when installation tasks are performed at a client, the installation tasks may include selecting an appropriate installer based on the instruction in the metadata. The method 400 may further be practiced in a downstream server environment. In this embodiment, performing installation tasks may include for example copying files in the package to an applications directory and making the files available to downstream clients. Thus, a downstream server may include functionality for verifying a package for installation before providing that package to downstream clients.

The method 400 may further include providing a program key to an upstream server as part of a server-server protocol to obtain the package. For example, as discussed above, a downstream server may provide an appropriate program key to indicate the desire to obtain a particular software installation.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment, a method of sending installation information, the method comprising:
    signing a package including installation information, wherein the package is a delta package;
    creating a hash of the package, wherein the hash identifies both a full package and the delta package;
    creating a metadata data set, wherein the metadata data set comprises a description of the package, an identification for the package, applicability rules describing intended recipients of the installation information, the hash of the package, a revision number, a priority indication for the package and installation instructions for the package, the priority indication being separate from the revision number and the identification for the package;
    publishing the metadata data set at a root server in a hierarchy of servers;
    distributing the metadata data set to at least one other server in the hierarchy of servers;
    sending the metadata data set to each system in a defined target group of systems, wherein at least a first server in the hierarchy of servers sends the metadata data set to a first system in the defined target group of systems and wherein at least a second server in the hierarchy of servers sends the metadata data set to a second system in the defined target group of systems, and wherein the defined target group of systems is selected from a plurality of defined target groups in the network computing environment;
    receiving a request for one of the delta package and full package from the first system;
    wherein the request is based on the received hash of the package;
    providing one of the delta package and full package to the first system.

2. The method of claim 1, wherein the metadata data set further includes an indication that the package includes at least a portion of one of an application or an update.

3. The method of claim 1, wherein the metadata data set further includes a onetime-use indicator, the onetime-use indicator indicating that the package is installable only once on one of the one or more systems of the defined target group of systems.

4. The method of claim 1, wherein sending the metadata data set to one or more systems of the defined target group of systems comprises sending the metadata data set over a secure channel.

5. The method of claim 1, further comprising performing an antivirus scan of one or more application files included in the package.

6. The method of claim 1, wherein the installation information includes an application for uninstalling software.

7. The method of claim 1, wherein the metadata data set includes expiration information for the installation information.

8. The method of claim 1, wherein the metadata data set comprises information specifying a particular installer.

9. The method of claim 8, wherein the particular installer includes a command line installer.

10. The method of claim 1, wherein signing a package comprises signing the package using a certificate, the certificate selected from a group consisting of a third party installed certificate and a self-signed certificate.

11. The method of claim 1, further comprising assigning a weight to the target group, wherein the weight is based on a position of a server in the server hierarchy.

12. A memory device storing computer executable instructions that, when executed by a processor, perform a method of sending installation information, the method comprising:
    generating a plurality of data fields representing a metadata data structure, the plurality of data fields including:
    a description of a software package including installation information, wherein the package is a delta package;

an identification for the software package;
applicability rules describing intended recipients of the installation information in the software package;
a revision number;
a priority indication of the software package, the priority indication being distinct from the revision number and the identification for the software package;
a hash of the software package, wherein the hash identifies both a full package and the delta package; and
installation instructions for the package;
publishing the metadata data structure at a root server in a hierarchy of servers;
distributing the metadata data structure to at least one other server in the hierarchy of servers; and
sending the metadata data set to each system in a defined target group of systems, wherein at least a first server in the hierarchy of servers sends the metadata data structure to a first system in the defined target group of systems and wherein at least a second server in the hierarchy of servers sends the metadata data structure to a second system in the defined target group of systems, wherein the defined target group of systems is selected from a plurality of defined target groups in a network computing environment;
receiving a request for one of the delta package and full package from the first system;
wherein the request is based on the received hash of the package;
providing one of the delta package and full package to the first system.

13. The memory device of claim 12, wherein one or more systems of the defined target group of systems belong to a second defined target group of systems in the plurality of defined target groups.

14. The memory device of claim 12, wherein the metadata data structure further includes an indication that the package includes at least a portion of one of an application or update.

15. The memory device of claim 12, wherein the metadata data structure further includes a onetime-use indicator, the onetime-use indicator indicating that the package is installable only once on one of the one or more systems of the defined target group of systems.

16. The memory device of claim 12, wherein each of the plurality of defined target groups is determined by an administrator.

17. A computer system comprising:
one or more processors; and
a memory operatively connected to the one or more processors, the memory for storing instructions that, when executed by the one or more processors, causes the one or more processors to perform a method of sending installation instructions, the method comprising:
signing a package including installation information, wherein the package is a delta package;
creating a hash of the package, wherein the hash identifies both a full package and the delta package;
creating a metadata data set, wherein the metadata data set comprises a description of the package, an identification for the package, applicability rules describing intended recipients of the installation information, the hash of the package, a revision number, a priority indication for the package and installation instructions for the package;
publishing the metadata data set at a root server in a hierarchy of servers; distributing the metadata data set to at least one other server in the hierarchy of servers; and
sending the metadata data set to each system in a defined target group of systems, wherein at least a first server in the hierarchy of servers sends the metadata data set to a first system in the defined target group of systems and wherein at least a second server in the hierarchy of servers sends the metadata data set to a second system in the defined target group of systems, wherein the defined target group of systems is selected from a plurality of defined target groups in a network computing environment;
receiving a request for one of the delta package and full package from the first system;
wherein the request is based on the received hash of the package;
providing one of the delta package and full package to the first system.

18. The system of claim 17, wherein one or more systems of the defined target group of systems belong to a second defined target group of systems in the plurality of defined target groups.

19. The system of claim 17, wherein each of the plurality of defined target groups is determined by an administrator.

* * * * *